United States Patent

Andrie

[11] Patent Number: 5,152,144
[45] Date of Patent: Oct. 6, 1992

[54] AIR TO AIR HEAT EXCHANGER INTERNAL BYPASS

[75] Inventor: Michael J. Andrie, Columbus

[73] Assignee: Cummins Engine Company, Inc., Columbus, Ind.

[21] Appl. No.: 814,050

[22] Filed: Dec. 26, 1991

Related U.S. Application Data

[63] Continuation of Ser. No. 585,006, Sep. 19, 1990, abandoned.

[51] Int. Cl.$^5$ .......................... F02B 29/04; F28F 9/02
[52] U.S. Cl. ........................ 60/599; 123/549; 165/51; 165/39; 165/35; 165/34; 165/32
[58] Field of Search .......... 60/599; 123/563; 165/51, 32, 34, 35, 39

[56] References Cited

U.S. PATENT DOCUMENTS

| | | |
|---|---|---|
| 3,450,109 | 6/1969 | Gratzmuller . |
| 4,000,725 | 1/1977 | Harris . |
| 4,186,560 | 2/1980 | Frankl . |
| 4,385,496 | 5/1983 | Yamane .............. 123/563 |
| 4,513,729 | 4/1985 | Udd . |
| 4,593,749 | 6/1986 | Schatz . |

FOREIGN PATENT DOCUMENTS

| | | | |
|---|---|---|---|
| 0145325 | 8/1984 | Japan ................... 60/599 |
| 0190425 | 10/1984 | Japan ................... 123/563 |
| 0050225 | 3/1985 | Japan ................... 123/563 |
| 0088821 | 5/1985 | Japan ................... 60/599 |
| 0237998 | 10/1986 | Japan ................... 123/563 |
| 0046194 | 2/1987 | Japan ................... 123/563 |
| 0195324 | 8/1988 | Japan ................... 60/599 |
| 0198724 | 8/1988 | Japan ................... 123/563 |
| 1255956 | 12/1971 | United Kingdom ...... 123/563 |

OTHER PUBLICATIONS

Engine Charge Air Cooler Nomenclature-SAE J1148, from 1982 SAE Handbook (Part 2) SAE Recommended Practice J1148 1982.
SAE Technical Paper 800501 (Abstract) 1980.

*Primary Examiner*—John K. Ford
*Attorney, Agent, or Firm*—Sixbey, Friedman, Leedom & Ferguson

[57] ABSTRACT

A throttle valve positioned at either the inlet or outlet of an internal combustion engine aftercooler has the advantages of increased air charge temperature and lower air pressurization at low ambient air temperatures. The throttle valve reduces the effective aftercooler cross-sectional area available to transfer heat energy from the air charge to the atmosphere. The air velocity increase through the restricted aftercooler also decreases the heat transferred to the atmosphere. The air charge thus retains more heat energy in the form of higher intake air charge temperatures. The throttle valve also imposes a flow restriction to the aftercooler, causing an increased pressure differential across the aftercooler, which decreases the amount of pressure boost actually delivered to the engine cylinder to desirable pressure levels.

18 Claims, 1 Drawing Sheet

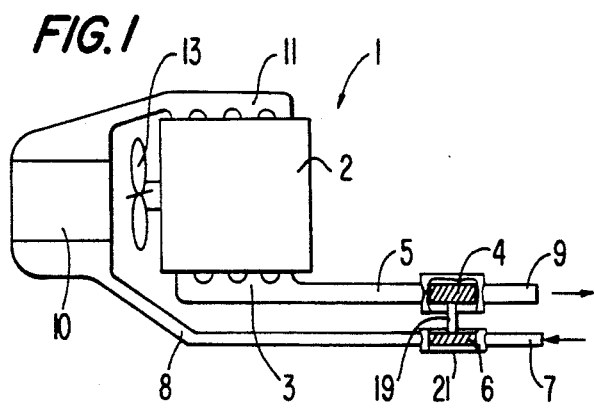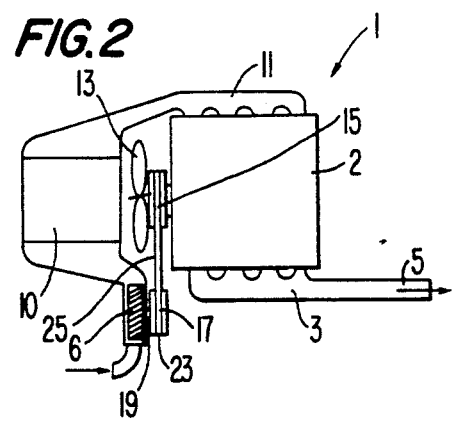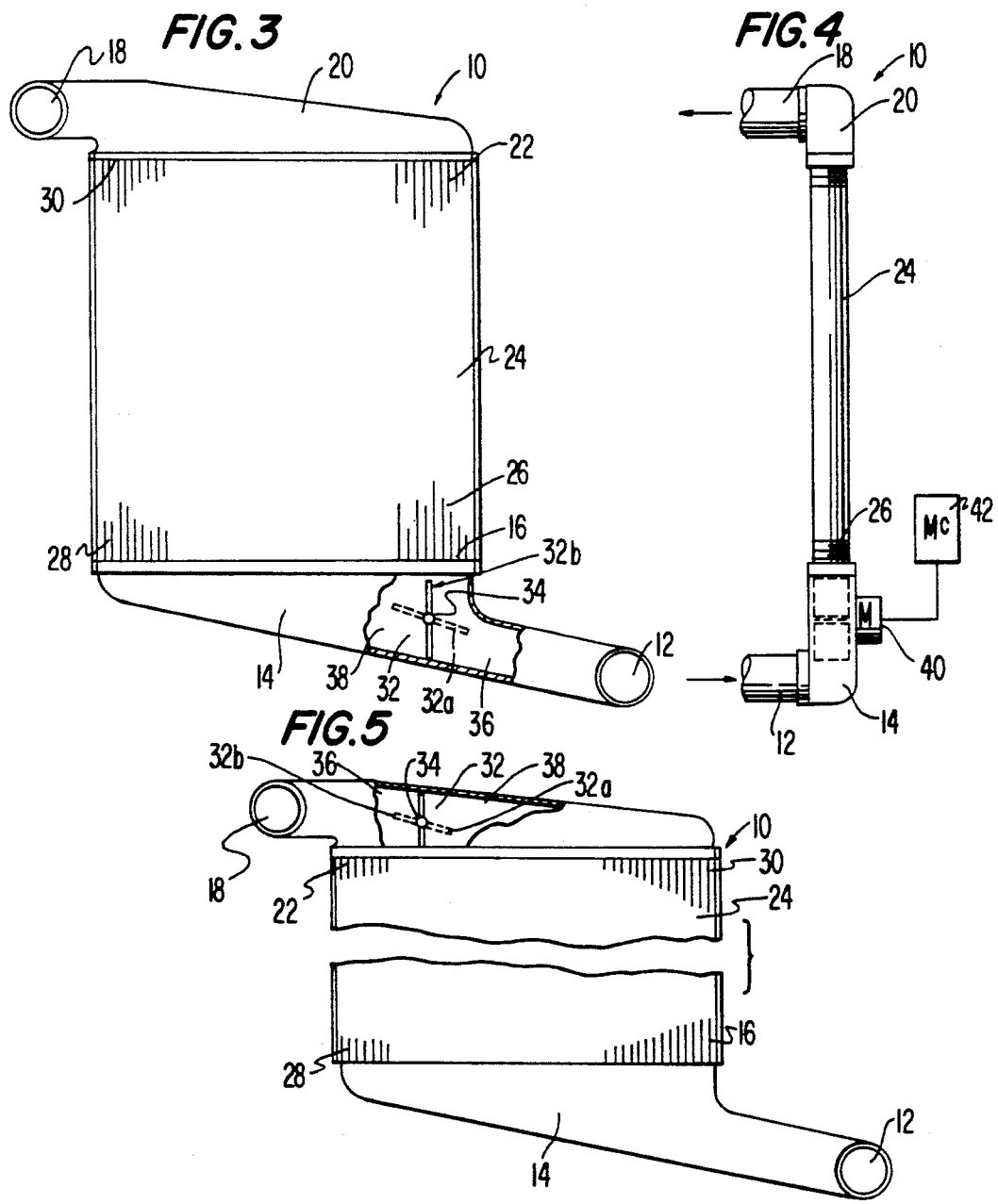

AIR TO AIR HEAT EXCHANGER INTERNAL BYPASS

This application is a continuation of Ser. No. 07/585,006, filed Sep. 19, 1990, now abandoned.

FIELD OF THE INVENTION

The present invention relates to induction cooling systems for internal combustion engines. More particularly, this invention relates to a variable air cooling system for engines equipped with superchargers for improved engine operation at low ambient air temperatures.

BACKGROUND OF THE INVENTION

Superchargers have long been known and used to increase the power output of internal combustion engines without increasing the engine displacement. Superchargers, as referred to herein, generally include both mechanically driven and exhaust driven mechanisms. The amount of power developed by an engine is often limited only by the air mass that can be inducted into the engine cylinders to stoichiometrically react with the provided fuel. Compression of the incoming air charge by supercharging increases the density of the air charge, thus providing additional air mass per unit volume within the engine combustion chamber. This additional air mass allows the introduction of proportionally greater fuel mass as stored chemical energy, hence increasing the net engine power output without increasing the size of the engine or modifying the engine displacement.

The supercharging process also tends to significantly increase the temperature of the compressed air charge above ambient temperatures (air temperatures exceeding 300° F. are not uncommon). This increase in air temperature tends to lower the density of the air charge, with adverse consequences to the efficiency of the supercharger. Heat exchangers (referred to hereinafter as aftercoolers) are therefore often used in conjunction with superchargers to reduce the temperature of the compressed air charge to further increase the air change density.

An aftercooler is also effective against the deleterious effects of high air charge temperature on the operation of the engine. These high initial temperatures contribute to extreme final combustion temperatures, thus contributing to excessive thermal loading and high concentrations of NOx emissions created at very high air temperatures. Further, at least in spark-ignition engines, the elevated temperatures within the cylinder encourage auto-ignition, thereby contributing to excessive hydrocarbon emissions and lower engine efficiency. The supercharger and aftercooler, combined in the induction system, provide a cool, dense air charge to the engine to avoid these problems.

The benefits of supercharging and aftercooling are not uniformly realized at all operating conditions, however. At very low ambient temperatures, the air discharged from the supercharger is heated only moderately. Typical air-to-air aftercoolers, to which this invention is addressed, tend to reduce this air charge temperature to an even lower, and frequently undesirable, temperature.

Indeed, the air charge temperature obtained in conventional supercharger/aftercooler systems can be low enough to chill the cylinder wall surfaces as well as the air/fuel mixture in recently started engines. This cooling of the mixture, especially near the cylinder wall, prevents full combustion of the mixture. Thus, the hydrocarbon emissions of a "cold" engine increase, while the engine efficiency decreases. Also, the low air charge temperature entering the engine tends to lower the heat energy flowing to the engine coolant, which in turn tends to reduce the amount of heat energy available for other uses, such as heating the passenger compartment.

Further, as the ambient air temperature decreases, the air charge is initially denser. Consequently, the air charge pressure after supercharging and normal aftercooling is quite high, as is the engine cylinder pressure throughout the engine cycle. The increased pressure often exceeds the design strength specifications for the engine components and causes mechanical failures.

The invention thus is aimed at altering the operation of the aftercooler at cold ambient temperatures by reducing the efficiency of the aftercooler and negating some of the work of the turbocharger by imposing a pressure drop across the aftercooler.

SUMMARY OF THE INVENTION

Higher air charge temperatures and lower air charge pressurization at low ambient air temperatures is achieved by a single bypass valve positioned at either the inlet or outlet of the aftercooler. The bypass valve practically reduces the cross-sectional area of the aftercooler available to transfer heat energy from the incoming air charge to the ambient cooling air. The air velocity increase through the restricted aftercooler further decreases the heat rejected to the ambient air flowing about the exterior of the aftercooler. The air charge retains more heat energy in the form of higher intake air charge temperatures. The bypass valve also imposes a flow restriction to the aftercooler, causing a pressure differential across the aftercooler. This restriction tends to decreases the amount of pressure boost actually delivered to the engine, thus reducing the cylinder pressures to desirable levels.

The above, and other related features of the present invention will be apparent from a reading of the following description of the drawings and the appended claims.

BRIEF DESCRIPTION OF THE DRAWINGS

FIG. 1 is a plan view of a generalized block diagram showing the relative orientation of the present invention, including the internal combustion engine, exhaust system with a turbocharger, aftercooler, and intake system.

FIG. 2 is a plan view of a generalized block diagram showing the relative orientation of the present invention, including the internal combustion engine with a mechanically driven supercharger, exhaust system, aftercooler, and intake system.

FIG. 3 is a cross-sectional view of a representative aftercooler according to the present invention, showing the aftercooler inlet, core and outlet and the variable orifice located at the aftercooler inlet.

FIG. 4 is a plan view, taken perpendicularly to FIG. 3, of a representative aftercooler according to the present invention, showing the aftercooler inlet, core, outlet, variable throttle valve located at the aftercooler inlet and control device.

FIG. 5 is a cross-sectional view of a representative aftercooler according to the present invention, showing the aftercooler inlet, core and outlet and the variable throttle valve located at the aftercooler outlet.

BRIEF DESCRIPTION OF THE PREFERRED EMBODIMENT

Referring to the drawings, wherein reference characters designate like or corresponding parts throughout the views, FIG. 1 illustrates a typical, generalized vehicle powerplant 1 equipped with a turbocharger 21, which includes internal combustion engine 2. Internal combustion engine 2 is comprised of exhaust manifold 3 and exhaust duct 5, which feed exhaust gases to turbine 4. Turbine 4 in turn rotates a symbolic shaft 19 connected to a compressor 6, causing the compressor 6 to pressurize the engine air charge entering an intake duct 7. The exhaust continues through tailpipe 9 and is vented to the atmosphere.

The air charge pressurized by the compressor 6 is transported by an intake duct 8 to an aftercooler 10, which will be further discussed later, and then is directed to an intake manifold 11. For several reasons, one which will be presently addressed, the engine 2 is often provided with a cooling fan 13.

FIG. 2 shows a similar powerplant 1 layout, except that the turbocharger 21 is replaced with a supercharger 23. Exhaust gasses are directed away from the engine 2 via an exhaust manifold 3, exhaust duct 5 and tailpipe (not sown) in the well known manner. The engine 2 is further provided, generally in combination with the fan 13, with a drive pulley 15 connected to a compressor pulley 17 by a drive belt 25. The compressor pulley 17 drives a compressor 6 via a symbolic shaft 19. Other means of driving the compressor 6, however, may likewise be advantageously employed. The compressor 6 compresses the air charge entering the intake duct 7 and operates as indicated above.

Referring to FIG. 3, a cross-sectional view of the aftercooler 10 according to the present invention is shown. Air from the turbocharger 21 or supercharger 23 enters the aftercooler through inlet port 12, located below the aftercooler 10. The aftercooler 10 comprises air inlet port 12, inlet header 14 and a plurality of inlet passages 16. The air inlet port 12 allows air to enter the inlet header 14. The inlet header 14 totally encloses aftercooler inlet passages 16.

The aftercooler 10 further comprises air outlet port 18, outlet header 20 and a plurality of outlet passages 22. Air exits the aftercooler through outlet port 18, located above the aftercooler 10, for further transportation to the engine intake manifold 11. The outlet port 18 thus allows air to exit the outlet header 20. The outlet header 20 totally encloses aftercooler outlet passages 22. Positioned between the inlet header 14 and the outlet header 20 is aftercooler core 24.

The aftercooler core 24 comprises a plurality of air charge passage tubes 26, each of which is capable of providing segregated communication of the pressurized air charge from the inlet header 14 and the outlet header 20. The aluminum or galvanized steel tubes 26 are individually constructed and separated from each other by a small gap 28. The gap 28 is determined by well known methods for designing heat transfer devices. The interior of each tube 26 is a generally smooth bore of sufficient interior diameter, again determined according to well known methods for designing heat transfer devices, providing an interface surface area for the transfer of the air charge heat energy. The exterior of each tube 26 may also be provided with cooling fins 30 according to well known methods for designing heat transfer devices in order to improve the efficiency of the aftercooler 10.

When the vehicle moves through ambient air, or when the vehicle is stationary and the optional fan 13 is operational, the ambient air is caused to flow through the aftercooler core 24 and around each of the air charge passage tubes 26 through the gaps 28. Since the air charge temperature entering the interior of the tubes 26 from the inlet header 14 may exceed 300° F. and the ambient air temperature is significantly below 300° F., i.e., 70° F. thermal energy is thus lost by the air charge, through the walls of the tubes 26 and absorbed by the ambient air flowing around each tube 26. Thus, the temperature of the air charge reaching the outlet header 20 is cooled to about 110° F. The inlet header 14 air charge pressure, initially at 38.3 PSIA, is reduced to only 36.8 PSIA at the outlet header 20. Accordingly, in normal operation, with all air charge passage tubes 26 functioning, the aftercooler 10 provides relatively cool, pressurized air to the engine.

Located either in the inlet header 14 as shown in FIG. 3 or the outlet header 20 as shown in FIG. 5, a throttle valve 32 is added to the aftercooler 10. The throttle valve 32 is preferably comprised of essentially a butterfly-type valve, rotatable about pivot 34. The throttle valve 32 of FIG. 3 is positioned to selectively partition the inlet header 14 into two chambers, namely operative chamber 36 and stagnation chamber 38. The operative chamber 36 provides communication between the air inlet port 12 and the inlet passages 16 of a portion of the air charge passage tubes 26 at all times. The stagnation chamber 38, capable of being closed by throttle valve 32 to air charge flow through the inlet header 14, remains in communication with the dormant inlet passages 16 of the remaining portion of the air charge passage tubes 26.

Throttle valve 32, by being rotatable about pivot 34, is selectively positioned at either a full open position, corresponding to throttle valve 32a in FIGS. 3 and 5, or a full closed position, corresponding to throttle valve 32b in FIGS. 3 and 5. Throttle valve 32 is also capable of being selectively positioned at an intermediate position between full open and full closed to obtain a range of aftercooler efficiencies between the full open and full closed operating positions.

Thus, the air charge entering the aftercooler 10 is forced to flow through only a portion of the tubes 26 when the throttle valve 32 is completely or partially closed to separate the inlet header 14 into the operative chamber 36 and stagnation chamber 38. The most effective flow restriction has been found to be 10 to 20% of original flow at very low ambient temperatures. This percentage, however, is very dependant on overall system configuration and is not expected to be uniform for all systems. The ability of the aftercooler 10 to transfer heat through the reduced surface area of the core 24 is thereby diminished and the air charge flow velocity through the operational portion of inlet passages 16, the tubes 26, and the outlet passages 22 is increased. The increased flow rate tends to lower the efficiency of the aftercooler 10 due to the shorter time the air charge has within the passages 26 to transfer its thermal energy.

The throttle valve 32 is caused to modify the efficiency of the aftercooler 10, as described above, due to the rotational position of the throttle valve 32 as determined by the controller 42. The controller 42 is provided, preferably, with an electrical signal supplied by any of several well known and commercially available temperature sensing devices. This electrical signal, varying in relation to the ambient air temperature, is processed by the controller 42 to cause the actuation of an electric motor 40. In the preferred embodiment, whenever the ambient air temperature falls below 20° F., the controller 42 commands the motor 40 in the well known manner to rotate the throttle valve 32 from the full open position, corresponding to throttle valve 32a in FIGS. 3 and 5, to the full closed position, corresponding to the throttle valve 32b in FIGS. 3 and 5.

Temperatures below 20° F. have been determined to degrade the performance of the engine after pressurization by the supercharger and normal aftercooling. For example, the extremely low ambient air temperature of −20° F., the air charge temperature reaching the inlet header is only 218° F. The aftercooler 10, with the throttle valve 32 full open as shown as 32a in FIGS. 3 and 5, will reduce the temperature of this air charge to 11° F. at the outlet header 20. Reducing the effective core 24 to only a portion of the tubes 26 results in an air charge temperature of 54° F. at the outlet header 20, which is above the temperature contributing to misfiring cylinders.

It should be apparent to those skilled in the art that alternative control means may be available to modulate the rotational position of the throttle valve 32 relative to the ambient air temperature, or any other relevant physical parameter. For example, a bi-metallic coil spring can be positioned outside of the assembly so as to operatively rotate the throttle valve 32 in response to fluctuations in the ambient air temperature.

The pressure created by the restriction of throttle valve 32 when rotated away from the open throttle valve position 32a decreases the pressure at the outlet header 20. This lower air charge pressure reaching the engine lowers the peak cylinder pressures. Without the restriction, the air charge, from an ambient temperature of −20° F., for example, is subject to pressurization such that the air charge pressure is 40.8 PSIA, which contributes to mechanical failures and auto ignition in the engine cylinder. The restriction lowers the pressure of the air charge to 35.8 PSIA, which is far less damaging.

Thus, a simple and inexpensive device has been described to increase the air charge temperature reaching an internal combustion engine equipped with a supercharger and an aftercooler at very low ambient air temperatures. Further, the air charge pressure is reduced by the flow restriction added to the aftercooler. The portion of the aftercooler subject to the flow restriction is dependent on the specific air induction system configuration and must be determined on a case-by-case basis.

A preferred embodiment of the present invention has been described, however, it is not intended to limit the spirit and scope of the invention. It will be understood that various changes in the details, arrangements and configuration of the parts which have been described and illustrated above in order to explain the nature of the present invention may be made by those skilled in the art within the principle and scope of the present invention as expressed in the appended claims.

What is claimed is:

1. An induction system for providing a pressurized air charge to an internal combustion engine, comprising:
    means for receiving said pressurized air charge,
    temperature reduction means positioned downstream from and in communication with said receiving means for reducing the temperature of said pressurized air charge,
    means for conveying said pressurized air charge from said temperature reduction means positioned downstream from said temperature reduction means,
    said temperature reduction means comprising a plurality of passages for reducing the thermal energy of said pressurized air charge, and
    control means to reduce selectively the number of said plurality of passages receiving said pressurized air charge to increase said thermal energy of said pressurized air charge by causing the temperature of said pressurized air charge arriving at said internal combustion engine to be increased while simultaneously reducing the pressure of said pressurized air charge arriving at said internal combustion engine, said control means being positioned, when operating, to reduce or eliminate pressurized air flow through substantially more than one half of said plurality of passages.

2. The induction system of claim 1 wherein said control means regulates the reduction of said thermal energy of said pressurized air charge by altering the velocity of said air charge through said plurality of passages receiving said pressurized air charge.

3. The induction system of claim 1 wherein said control means includes a valve means to selectively vary the number of said plurality of passages receiving said pressurized air charge to regulate the reduction of said thermal energy of said pressurized air charge.

4. The induction system of claim 3 wherein said valve means is disposed between said means for receiving said pressurized air charge and said temperature reduction means.

5. The induction system of claim 3 wherein said valve means is disposed between said temperature reduction means and said means for conveying said pressurized air charge from said temperature reduction means.

6. The induction system of claim 3 wherein said valve means includes a valve element movable to a position between a fully open position and a fully closed position to regulate the reduction of said thermal energy of said pressurized air charge.

7. An induction system for providing a pressurized air charge to an internal combustion engine, comprising:
    means for pressurizing said pressurized air charge,
    means for receiving said pressurized air charge,
    temperature reduction means positioned downstream from and in communication with said receiving means for reducing the temperature of said pressurized air charge, and
    means for conveying said pressurized air charge from said temperature reduction means positioned downstream from said temperature reduction means,
    said temperature reduction means comprising a plurality of passages for reducing the thermal energy of said pressurized air charge, and
    control means to reduce selectively the number of said plurality of passages receiving said pressurized air charge and for increasing the flow rate of said air charge through said plurality of passages to reduce the rate of said thermal energy being transported away from said pressurized air charge by causing the temperature of said pressurized air charge arriving at the internal combustion engine to be increased while simultaneously reducing the pressure of said pressurized air charge arriving at the internal combustion engine, said control means being positioned, when operating, to reduce or eliminate pressurized air flow through substantially more than one half of said plurality of passages.

8. The induction system of claim 7 wherein said control means further comprises valve means to selectively vary the number of said plurality of passages receiving said pressurized air charge to regulate the reduction of said thermal energy of said pressurized air charge.

9. The induction system of claim 7 wherein said means for pressurizing said pressurized air charge comprises a supercharging device mechanically coupled to said internal combustion engine.

10. The induction system of claim 7 wherein said internal combustion engine comprises an exhaust system, and said means for pressurizing said pressurized air charge comprises a turbocharging device combined with said exhaust system of said internal combustion engine.

11. An induction system for providing a pressurized air charge to an internal combustion engine, comprising:
    means for pressurizing said pressurized air charge,
    means for receiving said pressurized air charge,
    heat exchanging means positioned downstream from and in communication with said receiving means for reducing the temperature of said pressurized air charge,
    means for conveying said pressurized air charge from said heat exchanging means positioned downstream from said heat exchanging means,
    said heat exchanging means comprising a plurality of passages defining a sealed fluid flow of said pressurized air charge within said heat exchanger means for reducing the thermal energy of said pressurized air charge, and
    control means to reduce selectively the number of said plurality of passages receiving said pressurized air charge and for increasing the flow rate of said air charge through said plurality of passages to reduce the rate of said thermal energy being transported away from said pressurized air charge by causing the temperature of said pressurized air charge arriving at the internal combustion engine to be increased while simultaneously reducing the pressure of said pressurized air charge arriving at the internal combustion engine, said control means being positioned, when operating, to reduce or eliminate pressurized air flow through substantially more than one half of said plurality of passages.

12. The induction system of claim 11 further comprising a second fluid flow, wherein
    said heat exchanger comprises a plurality of tubes defining said plurality of passages, a common inlet, a common outlet, each of said plurality of tubes having an inner and outer surface,
    said inlet being in communication with said means for pressurizing said pressurized air charge and said outlet being in communication with said internal combustion engine;
    said inner surface of each of said tubes being in contact with said sealed fluid flow of said pressurized air charge to absorb said thermal energy of said pressurized air charge and said outer surface of each of said tubes being in contact with said second fluid flow to dissipate said thermal energy of said pressurized air charge.

13. The induction system of claim 12 wherein said outer surface of each of said tubes have at least one fin to increase the cross sectional surface area of said outer tube surface in contact with said second fluid flow.

14. The induction system of claim 12 wherein said second fluid flow comprises the relative motion of atmospheric air to said heat exchanger means.

15. An induction system for providing a pressurized air charge to an internal combustion engine, comprising:
    means for pressurizing said pressurized air charge,
    means for receiving said pressurized air charge,
    heat exchanging means positioned downstream from and in communication with said receiving means for reducing the temperature of said pressurized air charge, and
    means for conveying said pressurized air charge from said heat exchanging means positioned downstream from said heat exchanging means;
    said heat exchanging means comprising a plurality of passages defining a sealed fluid flow of said pressurized air charge within said heat exchanger means for reducing the thermal energy of said pressurized air charge, and
    control means to vary the number of said plurality of passages receiving said pressurized air charge and for varying the flow rate of said air charge through said plurality of passages only in response to substantially subfreezing ambient air temperatures;
    said control means comprising a valve means to selectively vary the number of said plurality of passages receiving said pressurized air charge to regulate the reduction of said thermal energy of said pressurized air charge whereby the temperature of said pressurized air charge arriving at said internal combustion engine is increased and the pressure of said pressurized air charge arriving at the internal combustion engine is decreased.

16. The induction system of claim 15 wherein said control means responds only to substantially subfreezing ambient air temperatures creating pressurized air charge temperatures and pressures outside of the optimum range of said pressurized air charge temperatures and pressures for said internal combustion engine.

17. A method for providing an increased air charge temperature and a reduced air charge pressure to an internal combustion engine;
    said internal combustion engine having means to pressurize said air charge and temperature reduction means positioned to reduce the temperature of said pressurized air charge received by said internal combustion engine;
    said temperature reducing means having a plurality of passages for reducing the thermal energy of said pressurized air charge flowing therethrough;
    said method including the steps of pressurizing said air charge,
    directing said air charge to said temperature reduction means, and
    varying the number of said plurality of passages for reducing said thermal energy of said pressurized air charge to increase the air charge temperature and reduce the air charge pressure in response to substantially subfreezing ambient air temperatures.

18. The method of claim 17, regulating the reduction of said thermal energy of said pressurized air charge by selectively varying the number of said plurality of passages.

* * * * *